(12) United States Patent
Lin (10) Patent No.: US 11,207,566 B2
(45) Date of Patent: Dec. 28, 2021

(54) BALANCE TRAINER, MOLD ASSEMBLY FOR MAKING THE SAME, AND MANUFACTURING PROCESS THEREOF

(71) Applicant: Chieh-Jen Lin, New Taipei (TW)

(72) Inventor: Chieh-Jen Lin, New Taipei (TW)

( * ) Notice: Subject to any disclaimer, the term of this patent is extended or adjusted under 35 U.S.C. 154(b) by 79 days.

(21) Appl. No.: 16/419,026

(22) Filed: May 22, 2019

(65) Prior Publication Data

US 2020/0368582 A1 Nov. 26, 2020

(51) Int. Cl.

| C08L 27/06 | (2006.01) |
|---|---|
| A63B 22/16 | (2006.01) |
| A63B 26/00 | (2006.01) |
| A63B 21/04 | (2006.01) |
| A63B 21/00 | (2006.01) |
| B29C 41/20 | (2006.01) |
| B29C 41/46 | (2006.01) |
| B29C 41/04 | (2006.01) |
| B29L 31/52 | (2006.01) |
| B29K 27/06 | (2006.01) |
| B29K 105/00 | (2006.01) |

(52) U.S. Cl.
CPC ........ *A63B 26/003* (2013.01); *A63B 21/0442* (2013.01); *A63B 21/4033* (2015.10); *A63B 22/16* (2013.01); *B29C 41/04* (2013.01); *B29C 41/20* (2013.01); *B29C 41/46* (2013.01); *C08L 27/06* (2013.01); *B29K 2027/06* (2013.01); *B29K 2105/0038* (2013.01); *B29K 2105/0044* (2013.01); *B29L 2031/52* (2013.01); *C08L 2201/08* (2013.01); *C08L 2205/06* (2013.01); *C08L 2207/322* (2013.01)

(58) Field of Classification Search
CPC ............ A63B 41/125; A63B 22/14–18; A63B 26/003; A63B 2026/006
See application file for complete search history.

(56) References Cited

U.S. PATENT DOCUMENTS

| 6,422,983 B1 * | 7/2002 | Weck | A63B 21/0004 482/146 |
|---|---|---|---|
| 6,554,753 B1 * | 4/2003 | Weck | A63B 21/0004 482/112 |
| 6,702,726 B2 * | 3/2004 | Lin | A63B 21/154 446/220 |
| 6,719,676 B1 * | 4/2004 | Hsu | A63B 21/0004 446/220 |

(Continued)

*Primary Examiner* — Nyca T Nguyen
(74) *Attorney, Agent, or Firm* — Bacon & Thomas, PLLC (57) ABSTRACT

A balance trainer having a dome and a base formed integrally is provided. Also, a mold assembly for manufacturing the balance trainer that has a dome mold, a girdle, and a cover is provided. The girdle is sleeved on the dome mold and the cover is fixed on the girdle and thereby a cavity is formed in the mold assembly. Furthermore, a manufacturing process of the balance trainer is also provided. The process has the following steps: preparing ingredients of the dome and the base; feeding the ingredients of the dome into the dome mold; fixing a membrane on the dome mold via the girdle; feeding the ingredients of the base; sealing the ingredients via the cover; and then rotational molding. With the process and the mold, the rotational molding step can mold two materials at the same time, so the product can have two parts with different hardness.

8 Claims, 11 Drawing Sheets

(56) References Cited

U.S. PATENT DOCUMENTS

| | | | | |
|---|---|---|---|---|
| 6,740,008 B1* | 5/2004 | Ho | A63B 21/0004 | 482/123 |
| 6,945,919 B2* | 9/2005 | Yang | A63B 5/11 | 482/141 |
| 7,004,886 B2* | 2/2006 | Chen | A61H 1/0292 | 482/14 |
| 7,575,540 B1* | 8/2009 | Dobrow | A63B 21/0004 | 482/140 |
| 7,618,358 B2* | 11/2009 | Traub | A63B 26/003 | 482/147 |
| 8,460,161 B2* | 6/2013 | Cole | A63B 21/4035 | 482/52 |
| 8,926,483 B1* | 1/2015 | Holloway | A47C 7/021 | 482/142 |
| 9,011,295 B2* | 4/2015 | Orenstein | A63B 23/0458 | 482/52 |
| D735,822 S * | 8/2015 | Weck | D21/686 | |
| 9,095,738 B2* | 8/2015 | Senegal | A63B 4/00 | |
| 9,108,086 B1* | 8/2015 | Weck | A63B 43/002 | |
| 2004/0087421 A1* | 5/2004 | Lin | A63B 22/18 | 482/146 |
| 2005/0009677 A1* | 1/2005 | Yang | A63B 21/0004 | 482/142 |
| 2006/0040808 A1* | 2/2006 | Riazi | A63B 71/023 | 482/141 |
| 2006/0286339 A1* | 12/2006 | Chen | A63B 21/00047 | 428/68 |
| 2007/0207901 A1* | 9/2007 | Traub | A63B 26/003 | 482/52 |
| 2008/0064579 A1* | 3/2008 | Weck | A63B 26/003 | 482/146 |
| 2013/0053228 A1* | 2/2013 | Winegar | A63B 22/16 | 482/146 |
| 2013/0288866 A1* | 10/2013 | Rainey | A63B 22/18 | 482/146 |
| 2013/0316886 A1* | 11/2013 | Lynch | A63B 21/4035 | 482/146 |
| 2014/0309092 A1* | 10/2014 | De Michele | A63B 22/16 | 482/142 |
| 2017/0021220 A1* | 1/2017 | Pagano | A63B 21/0557 | |
| 2017/0165552 A1* | 6/2017 | Martin | A63B 26/003 | |
| 2017/0172331 A1* | 6/2017 | Publicover | A63B 21/4037 | |
| 2018/0264321 A1* | 9/2018 | Nir | A63F 13/22 | |

\* cited by examiner

BALANCE TRAINER, MOLD ASSEMBLY FOR MAKING THE SAME, AND MANUFACTURING PROCESS THEREOF

BACKGROUND OF THE INVENTION

1. Field of the Invention

The present invention relates to fitness equipment and a manufacturing mold and process form making the fitness equipment, especially to a balance trainer and a manufacturing mold and process form making the balance trainer.

2. Description of the Prior Arts

A balance trainer, or both-sides-up ball (a.k.a. bosu ball) is shaped like a semi-ball and comprises two portions: a dome portion being an upper side of the balance trainer and a plane portion being a bottom side of the balance trainer. Both of the two sides of the balance trainer can be used for training. With the balance trainer, a sense of balance and strengths of core muscles may be improved.

In the conventional balance trainers, the dome portion and the plane portion are connected via a connecting means. In other words, the dome portion and the plane portion are made separately and then fixed together. Therefore, the joint portions of the conventional balance trainers are fragile and easy to be broken.

To overcome the shortcomings, the present invention provides a balance trainer, a mold assembly for making the balance trainer, and a manufacturing process for making the balance trainer via said mold assembly to mitigate or obviate the aforementioned problems.

SUMMARY OF THE INVENTION

The main objective of the present invention is to provide a balance trainer, and a mold assembly and a manufacturing process of making the balance train that is formed integrally.

The balance trainer comprises a dome and a base. The dome has an outer edge. The base is formed with the dome integrally and has a connecting edge. The connecting edge is melt-connected to the outer edge of the dome.

The mold assembly comprises a dome mold, a girdle, and a cover. The dome mold has a domed cavity therein. The girdle is sleeved and fixed on the dome mold and encompasses the domed cavity. A surface of the domed cavity and an inner surface of the girdle form a continuous curved surface together. The cover is fixed on the girdle and encloses the continuous curved surface. The girdle is located between the dome mold and the cover.

The manufacturing process includes the following steps in sequence: (1) preparing ingredients for making a dome and ingredients for making a base respectively; (2) feeding the ingredients for making the dome into a dome cavity of a dome mold of a mold assembly; (3) fixing a membrane on the dome mold and thereby the ingredients of making the dome enclosed by the membrane and the dome mold; and then mounting the girdle on the membrane, a diameter of the membrane being larger than an outer diameter of a girdle of the mold assembly; (4) feeding the ingredients for making a base on the membrane and in the girdle; (5) covering and sealing the girdle and dome mold via a cover of the mold assembly, and thereby the ingredients for making a base enclosed by the membrane, the girdle, and the cover; (6) rotational molding, which includes the following acts in sequence: putting the mold assembly into a rotary furnace and rolling and heating the mold assembly; (7) finishing, which includes the following acts in sequence: taking out the mold assembly from the rotary furnace, cooling the mold assembly, and taking out the dome and the base from the mold assembly.

The balance trainer has the dome and the base formed integrally, which is different from the conventional balance trainer that is made via fixing a dome and a base manufactured separately by a third connecting component. In the balance trainer of the present invention, the dome and the base are melt-connected during molding the dome and molding the base at the same time. Therefore, an integral piece is formed with two different degrees of hardness.

One of the advantages of the balance trainer of the present invention is that the dome and the base are prevented from detaching from each other, and thereby the strength of the balance trainer of the present invention is higher than that of the conventional balance trainer. For example, the balance trainer of the present invention can sustain burden over 2000 kg. Besides, the base has structures for selectively mounting resistance bands without other components for fixing. Therefore, the manufacturing process is simplified. After the balance trainer is mounted with a resistance band, the user can balance on the balance trainer via pulling the resistance band.

In conventional rotational molding, one cavity of a mold only can be fed with ingredients under one formula, so the product only have one hardness and one color. However, the manufacturing process of the present invention can make a product with a soft part (i.e. the dome) and a hard part (i.e. the base) so the manufacturing process of the present invention overcomes the defect of conventional rotational molding. Therefore, the product may be formed integrally and beautiful, weight of the product may be reduced, and manufacturing cost is lower than that of the conventional manufacturing process.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
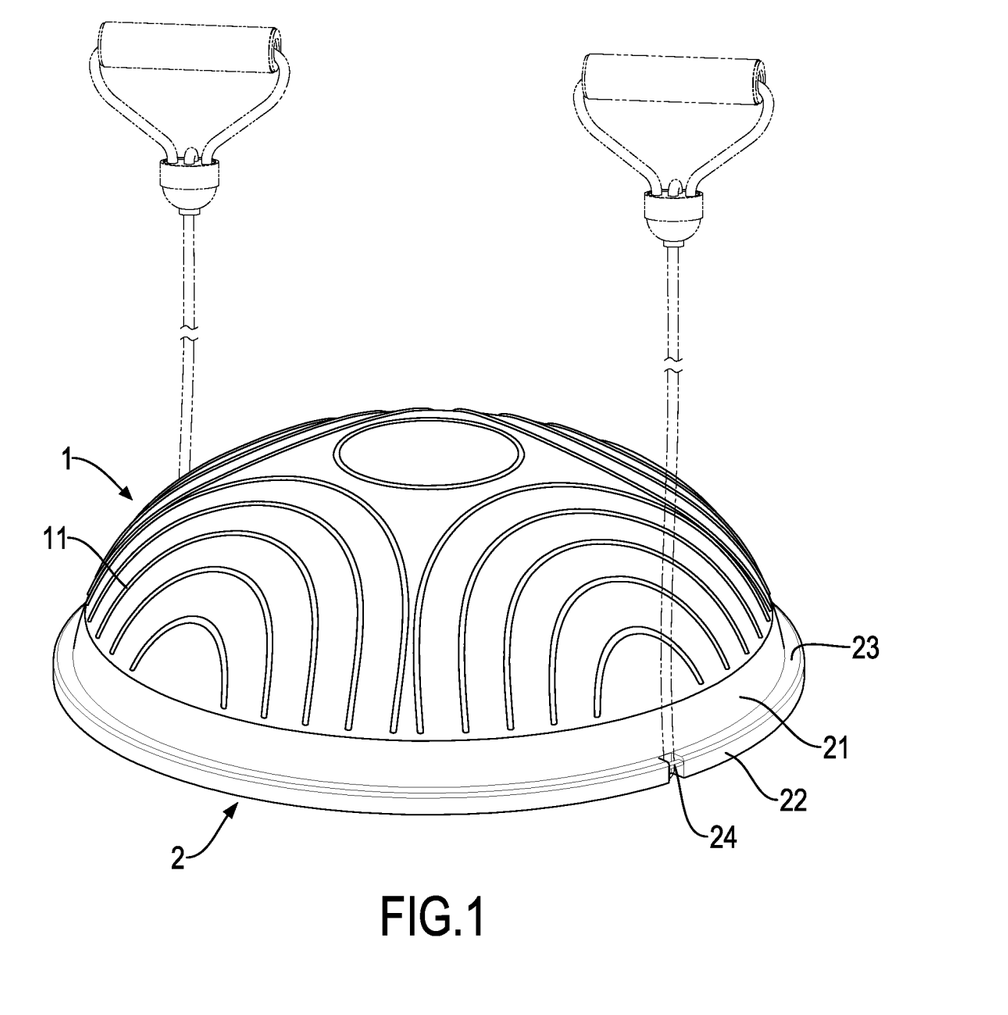
FIG. 1 is a perspective view of a balance trainer in accordance with the present invention shown with resistance bands.
Figure 2:
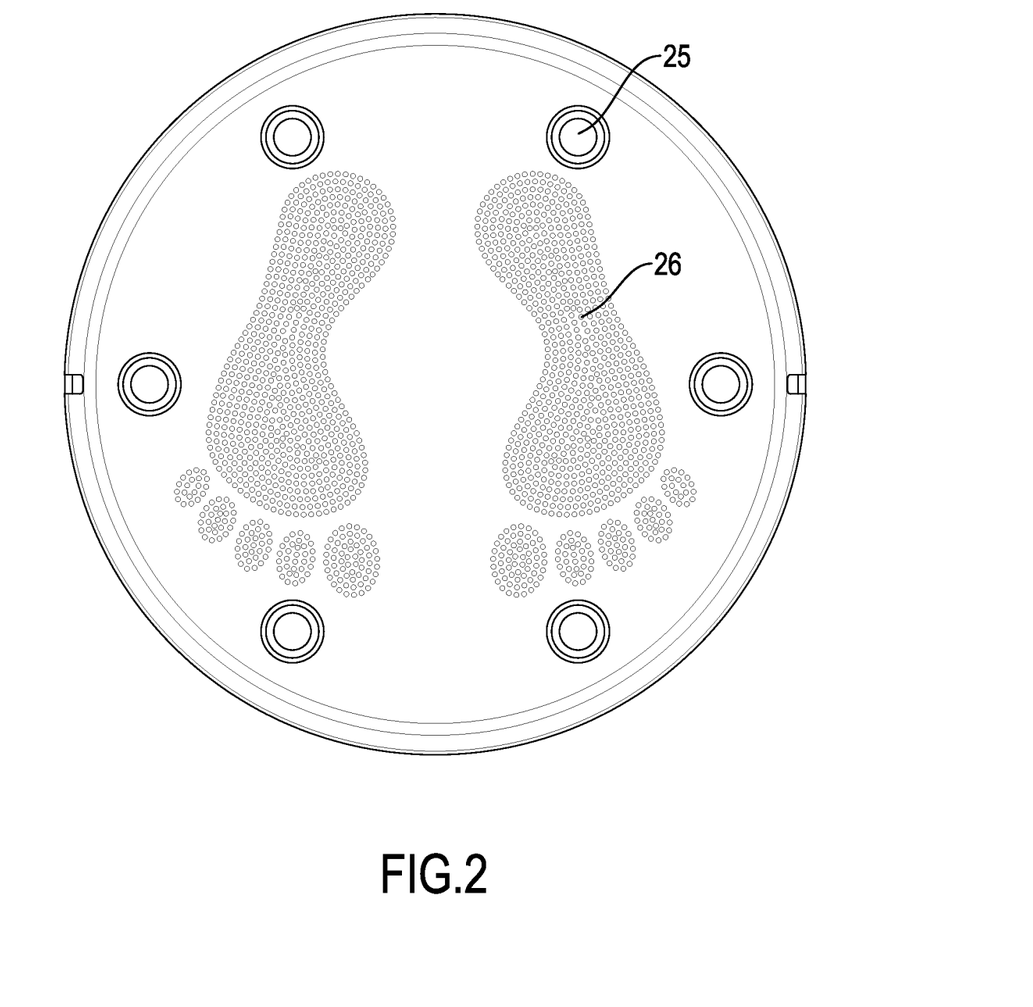
FIG. 2 is a bottom view of the balance trainer in FIG. 1.
Figure 3:
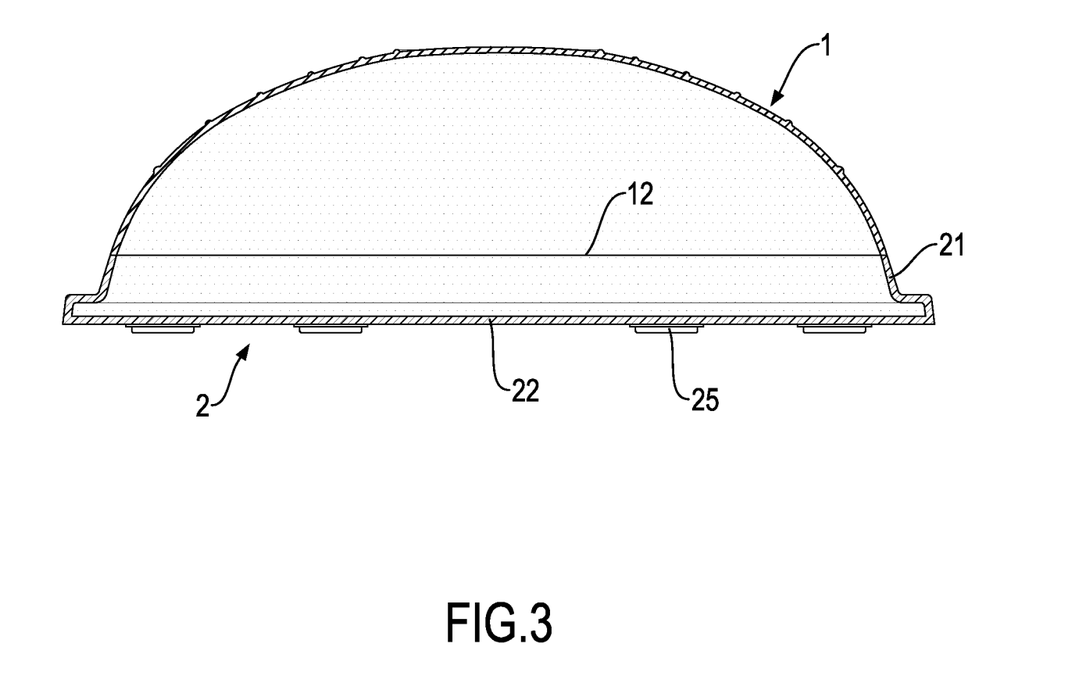
FIG. 3 is a sectional view of the balance trainer in FIG. 1.

With reference to FIGS. 1 to 3, a balance trainer made integrally via rotational molding in accordance with the present invention is provided. The balance trainer comprises a dome 1 and a base 2. The dome 1 is flexible and resilient and hardness thereof is lower than SG4. Hardness of the base 2 is higher than SG5 and thereby the base 2 is strong enough to support the dome. In this embodiment, the dome 1 is made from soft PVC and the base 2 is made from hard PVC. In this embodiment, the balance trainer is hollow, but it is not limited thereto, as the balance trainer may contain stuffing material or may be solid. Normally, the dome 1 is arranged to face upward and, correspondingly, the base 2 faces downward. Therefore, the up-down relation in the balance trainer is defined accordingly.

The base 2 comprises a connecting ring 21 and a bottom plate 22. A lower end surface of the dome 1 fits with an upper end surface of the connecting ring 21. In other words, a dimension of the lower end surface of the dome 1 is equal to a dimension of the connecting ring 21 of the base 2. The lower end surface of the dome 1 is melt-connected to the upper end surface of the connecting ring 21, and thus the dome 1 and the base 2 are formed integrally.

Ingredients of the dome 1 include Polyvinyl chloride paste resin, a plasticizer, a viscosity reducer, and a stabilizing agent. An amount of the Polyvinyl chloride paste resin ranges from 90 parts to 100 parts by weight; an amount of the plasticizer ranges from 45 parts to 55 parts by weight; an amount of the viscosity reducer ranges from 3.5 parts to 4.5 parts by weight; and an amount of the stabilizing agent ranges from 1 part to 3 parts by weight.

The Polyvinyl chloride paste resin of the dome 1 may be TPH-31 Polyvinyl chloride paste resin or PB-1302 Polyvinyl chloride paste resin, but it is not limited thereto.

The plasticizer of the dome 1 may contain epoxidized soybean oil (ESBO), tributyl citrate (TBC), dioctyl terephthalate (bis(2-ethylhexyl) benzene-1, 4-dicarboxylate or Di (2-ethylhexyl) terephthalate, abbreviated DOTP), or combinations thereof.

The viscosity reducer of the dome 1 may contain PVC viscosity reducer D-80, 2,2,4-trimethylpentane-1,3-diyl bis (2-methylpropanoate) (TXIB), or a combination thereof.

The stabilizing agent of the dome 1 may be liquid calcium zinc stabilizer.

In this embodiment, the ingredients of the dome 1 may include, by weight, 93.9 parts of Polyvinyl chloride paste resin, 50.45 parts of plasticizer (which may include 38.5 parts of TBC, 6.85 parts of DOTP, 5.1 parts of ESBO), 4.05 parts of PVC viscosity reducer D-80, and 1.65 parts of liquid calcium zinc stabilizer.

Ingredients of the base 2 include Polyvinyl chloride paste resin, a plasticizer, a viscosity reducer, and a stabilizing agent. An amount of the Polyvinyl chloride paste resin ranges from 180 parts to 220 parts by weight; an amount of the plasticizer ranges from 35 parts to 45 parts by weight; an amount of the viscosity reduction ranges from 14 parts to 18 parts by weight; and an amount of the stabilizing agent ranges from 1 part to 3 parts by weight. The plasticizer of the base 2 may contain ESBO, TBC, acetyl tributyl citrate (ATBC), DOTP, 1,2-Cyclohexane dicarboxylic acid diisononyl ester (DNICH), or combinations thereof.

The viscosity reducer of the base 2 may contain PVC viscosity reducer D-80, TXIB, or a combination thereof.

The stabilizing agent of the base 2 may be liquid calcium zinc stabilizer.

In this embodiment, the ingredients of the base 2 may include, by weight, 192 parts of the Polyvinyl chloride paste resin, 40 parts of the plasticizer (which may include 32 parts of TBC and 8 parts of ESBO), 12.75 parts of the viscosity reducer (which may include 10.75 parts of PVC viscosity reducer D-80 and 5.25 parts of TXIB), and 2 parts of liquid calcium zinc stabilizer.

The dome 1 comprises a non-slip pattern 11. The non-slip pattern 11 may be a plurality of protrusions mounted on an outer surface of the dome 1. In this embodiment, the protrusions may be a plurality of ribs. However, the non-slip pattern 11 may be a plurality of dimples or grooves. With protrusions or dimples of the non-slip pattern 11 densely arranged on the outer surface of the dome 1, the dome 1 is non-slip and provides a massaging effect.

The ingredients of the connecting ring 21 and the bottom plate 22 may be the same. The connecting ring 21 is mounted on the bottom plate 22. Therefore, the connecting ring 21 is located between the dome 1 and the bottom plate 22. The connecting ring 21 is a closed ring or loop. An outer diameter of the upper end surface of the connecting ring 21 is equal to that of the lower end surface of the dome 1.

A lower end surface of the connecting ring 21 is mounted on the bottom plate 22. An outer diameter of the bottom plate 22 is larger than that of the lower end surface of the connecting ring 21. Therefore, a portion of the bottom plate 22 that extends out of the connecting ring 21 is defined as a protrusion 23. Please also refer to FIG. 11. The base 2 comprises at least one buckle 24, a plurality of paving pads 25, and a non-slip pattern 26 on a lower surface of the bottom plate 22.

Figure 11:
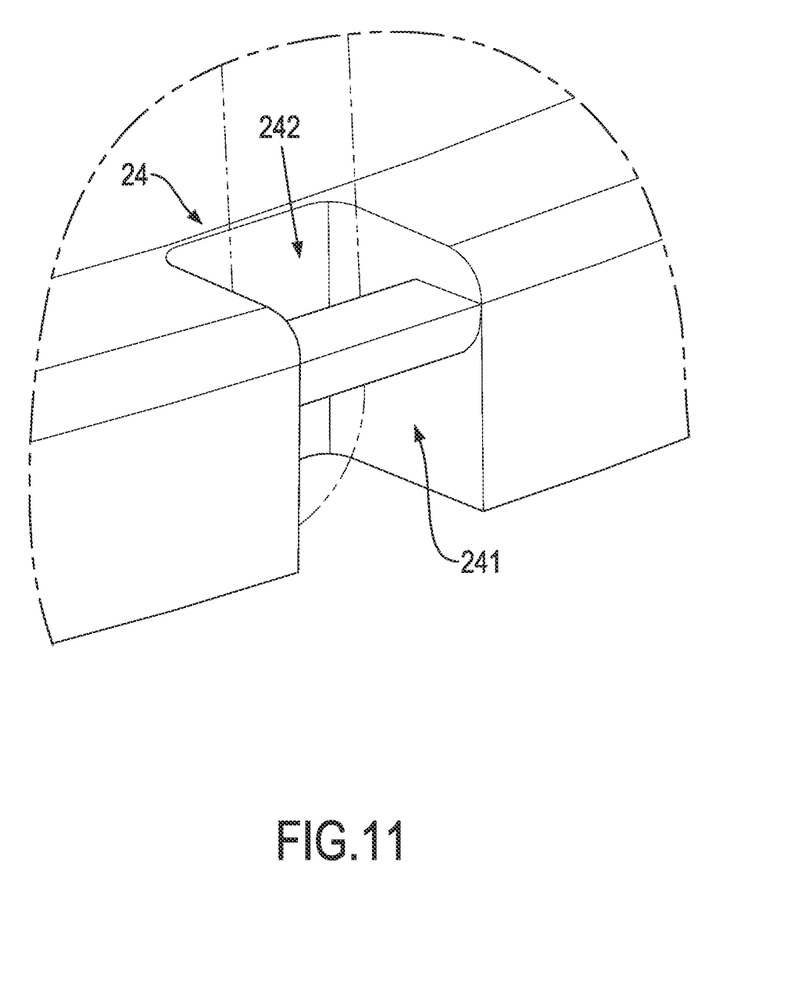
FIG. 11 is an enlarged view of the buckle in FIG. 1.

In this embodiment, an amount of the buckle 24 is two. The two buckles 24 are formed on a periphery of the base 2; in other words, the buckles 24 is formed integrally on the protrusion 23 of the base 2. Precisely, the buckles 24 are located on two ends of a diameter of the protrusion 23. Each one of the buckles 24 comprises a notch 241 and a through hole 242. The notch 241 is concaved from an outer edge of the protrusion 23. The through hole 242 is formed through the protrusion 23 and is inner than the notch 241. In another embodiment, the amount of the buckle 24 may be four or any other amount.

The paving pads 25 are configured to support the base 2 and prevent the base 2 from sliding. The paving pads 25 are arranged on the lower surface of the bottom plate 22 in a peripheral direction and spaced from each other by the same distance. A shape of each paving pad 25 may be a cylinder as shown in FIG. 3, but it is not limited thereto. For example, each paving pad 25 may be shaped like a crescent.

The non-slip pattern 26 covers a portion, where a user stands on, of the lower surface of the bottom plate 22 as shown in FIG. 1. The non-slip pattern 26 may be shaped like a human foot, but it is not limited thereto.

Figure 4:
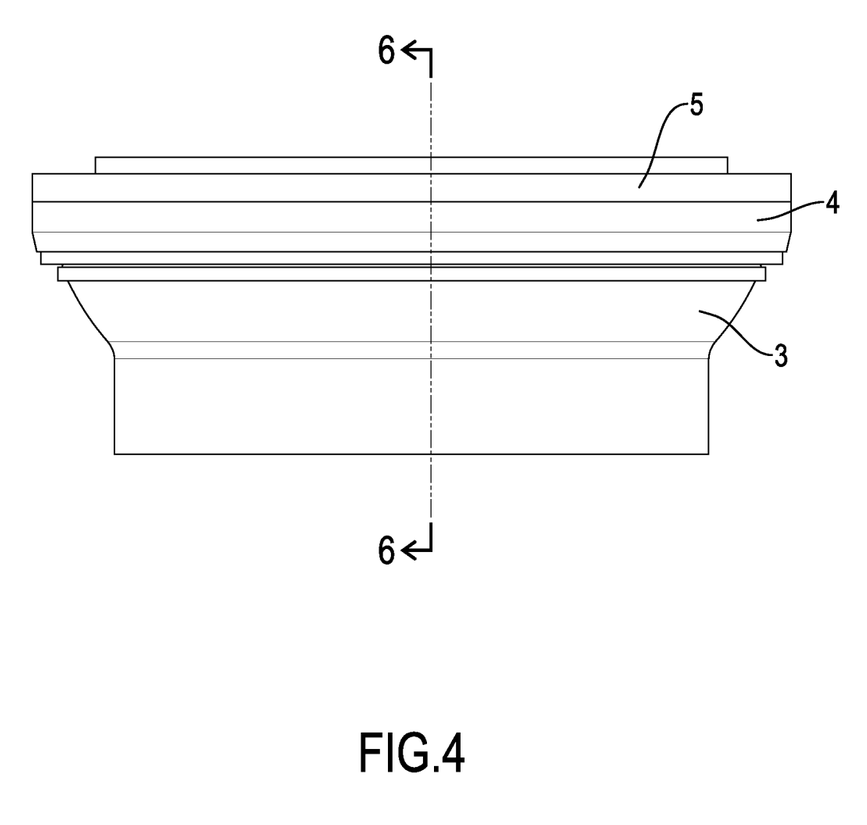
FIG. 4 is a side view of a mold assembly in accordance with the present invention for manufacturing the balance trainer in FIG. 1.
Figure 5:
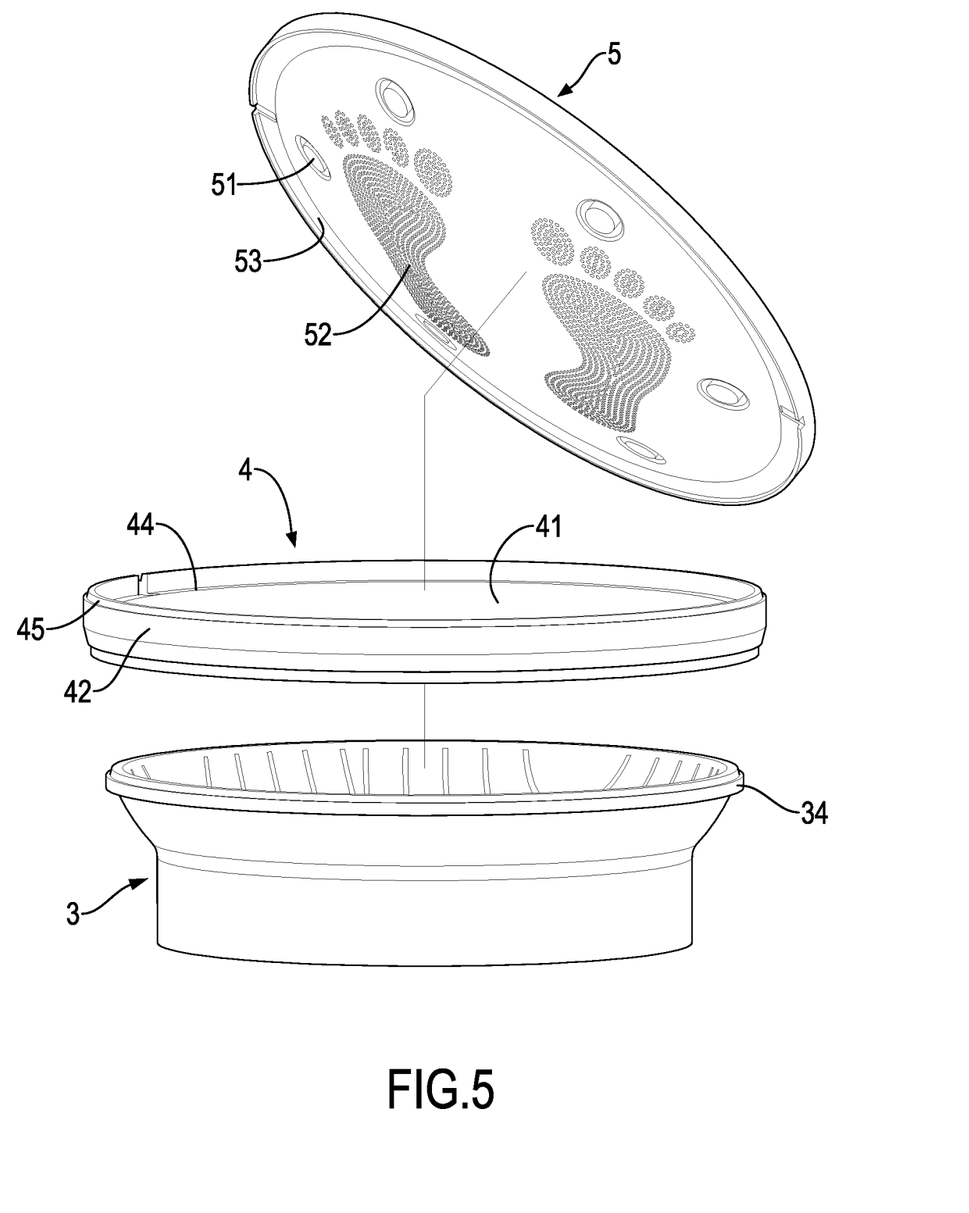
FIG. 5 is an exploded view of the mold assembly in FIG. 4.
Figure 6:
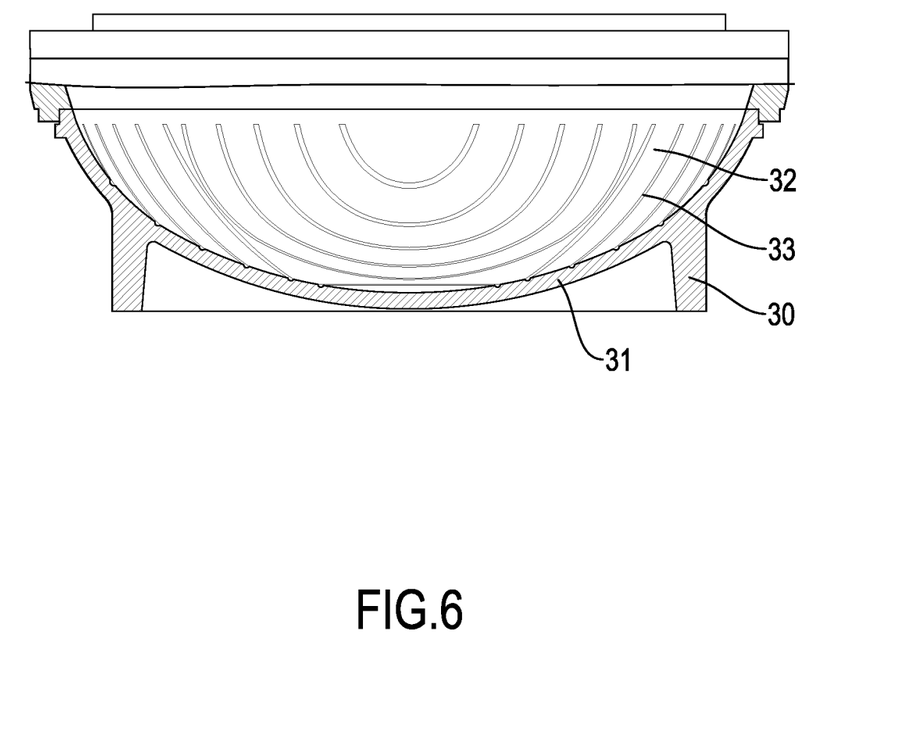
FIG. 6 is a sectional view of the mold assembly in FIG. 4.

With reference to FIGS. 4 to 6, a mold assembly for manufacturing a balance trainer in accordance with the present invention is provided. The mold assembly comprises a dome mold 3, a girdle 4, and a cover 5. The girdle 4 is mounted between the dome mold 3 and the cover 5.

In this embodiment, the dome mold 3 is a bottom part of the mold assembly, the cover 5 is a top part of the mold assembly, and the girdle 4 is a middle part of the mold assembly. Therefore, the up-down relation in the mold assembly is defined accordingly. However, the relation of the dome mold 3, the girdle 4, and the cover 5 are not limited thereto, as they may be arranged inversely or horizontally. Besides, a first direction points downward and a second direction points upward.

During forming a balance trainer via the mold assembly of the present invention, the balance trainer is upside down. In other words, as the balance trainer is contained in the mold assembly, the dome 1 of the balance trainer is lower than the base 2 of the balance trainer; it is not limited thereto.

The dome mold 3 comprises a supporter 30 and a main body 31. The main body 31 is supported by the supporter 31. Besides, the assembled mold assembly is supported by the supporter 31, too.

The dome mold 3 has a domed cavity 32 inside the main body 31. Therefore, the domed cavity 32 has an opening facing upward and the domed cavity 32 is dome-shaped. In this embodiment, the domed cavity 32 has a plurality of non-slip grooves 33 on a surface of the domed cavity 32. A shape of each non-slip groove 33 is made according to the shape of the non-slip pattern 11 of the balance trainer. In other words, concave or convex parts of the non-slip grooves 33 are opposite the non-slip pattern 11 of the balance trainer. Therefore, in this embodiment, each non-slip groove 33 extends downward and has an opening facing upward.

The main body 31 forms a mounting stage 34 for connecting, fixing and positioning the mounted girdle 4. The mounting stage 34 is formed via an annular protrusion protruding from a peripheral surface of the main body 31 and near a top surface of the main body 31 so that the girdle 4 can be put on the annular protrusion and sleeve the annular protrusion.

Figure 7:
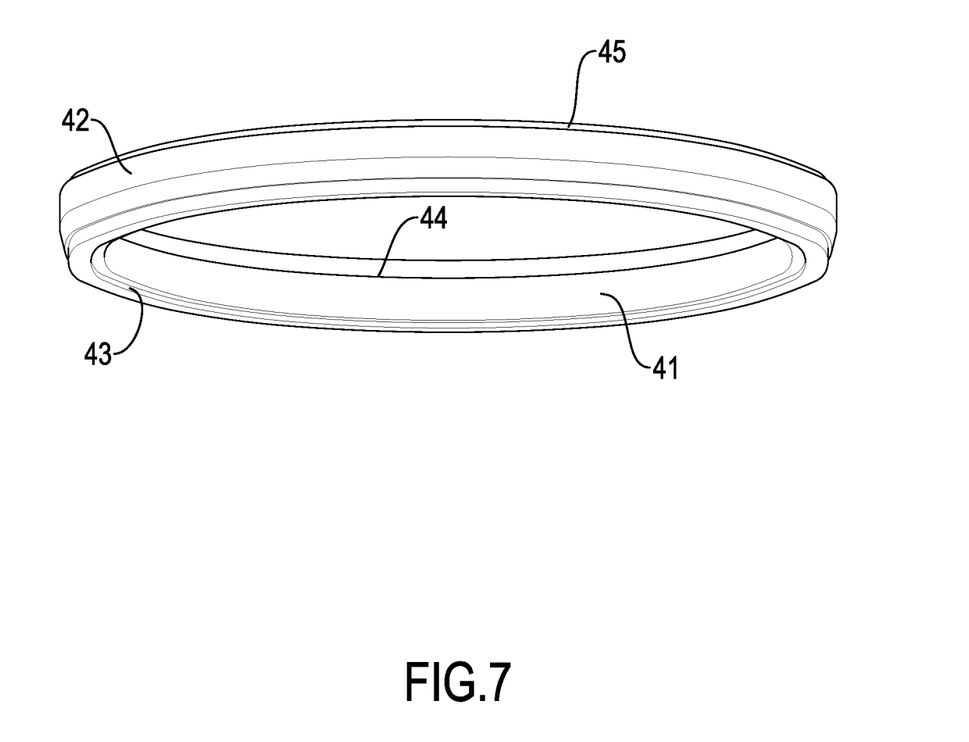
FIG. 7 is a perspective view of a girdle of the mold assembly in FIG. 4.
Figure 8:
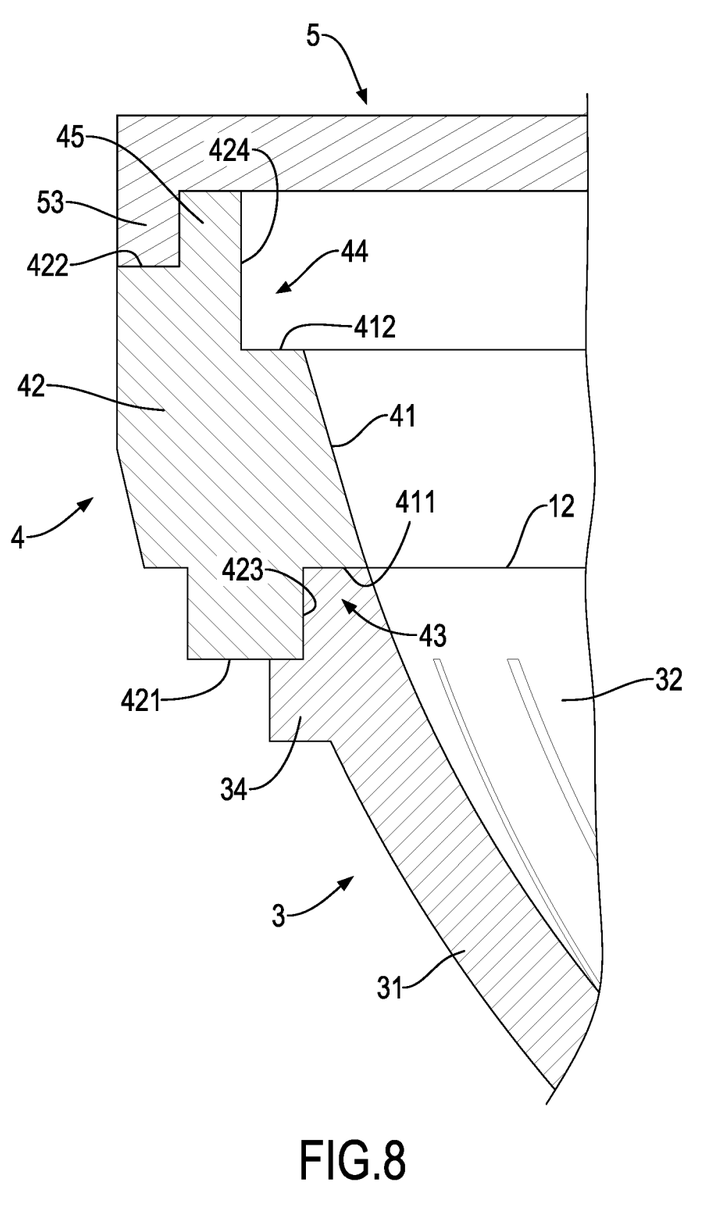
FIG. 8 is an enlarged sectional view of the mold assembly in FIG. 4.

Please refer to FIGS. 5, 7 and 8. The girdle 4 comprises an inner ring 41 and an outer ring 42. The inner ring 41 and the outer ring 42 are concentric. An outer surface of the inner ring 41 fits to and abuts an inner surface of the outer ring 42.

The inner ring 41 has a first end surface facing toward the first direction and a second surface facing toward the second direction, i.e., the first end surface faces the dome mold 3 and the second end surface faces the cover 5. Similarly, the outer ring 42 has a first end surface facing in the first direction and a second surface facing in the second direction, i.e., the first end surface faces the dome mold 3 and the second end surface faces the cover 5. Therefore, the first end surfaces of the inner ring 41 and the outer ring 42 are named as lower surfaces 411 and 421 respectively and the second end surfaces of the inner ring 41 and the outer ring 42 are named as upper surfaces 412 and 422 respectively.

The lower surface 411 of the inner ring 41 is higher than the lower surface 421 of the outer ring 42. The lower surface 411 of the inner ring 41, the lower surface 421 of the outer ring 42, and a first annular surface 423, which is between said two lower surfaces 411 and 421, of the outer ring 42 form an annular joined portion 43 together. The annular joined portion 43 is sleeved on the mounting stage 34 of the main body 31. In other words, the annular joined portion 43 receives an upper portion of the annular protrusion of the main body 31, and thereby the surface of the domed cavity 32 and the inner surface of the inner ring 41 connect to each other and form a continuous surface together as shown in FIG. 8. In this embodiment, the domed cavity 32 and the inner ring 41 form a cavity together.

The upper surface 412 of the inner ring 41 is lower than the upper surface 422 of the outer ring 42. The upper surface 412 of the inner ring 41, the upper surface 422 of the outer ring 42, and a second annular surface 424, which is between said two upper surfaces 412 and 422, of the outer ring 42 form a stepped stage 44. The stepped stage 44 is configured to join the cover 5. A thickness of the bottom plate 22 of the manufactured balance trainer is decided by a distance between said two lower surfaces.

Please refer to FIGS. 5 and 8. The cover 5 comprises a main body shaped like a round plate, and a rim 53. The main body of the cover 5 is a round plate. The rim 53 is mounted on a periphery of the main body of the cover 5. The rim 53 is detachably sleeved on the joined stage 45 of the girdle 4. Therefore, an inner diameter of the rim 53 is equal to an outer diameter of the joined stage 45.

The cover 5 further has a plurality of pad cavities 51 and a plurality of non-slip grooves 52 on the main body of the cover 5. The pad cavities 51 are arranged in a peripheral direction on the main body of the cover 5. An opening of each pad cavity 51 faces the domed cavity 32. An opening of each non-slip groove 52 faces the domed cavity 32, too.

The mold assembly of the present invention is assembled via the following steps: the girdle 4 is mounted on a top portion of the dome mold 3, the cover 5 is mounted on a top portion of the girdle 4, and thereby a closed chamber is formed therein. The domed cavity 32 of the dome mold 3 is configured to mold the dome 1 of the balance trainer, and the girdle 4 and the cover 5 are configured to mold the base 2 of the balance trainer. Before molding, a membrane 12 is mounted between the dome mold 3 and the girdle 4.

The girdle 4 comprises at least one bump on the stepped stage 44. In this embodiment, an amount of the bump is two, but and the two bumps are mounted on the stepped stage 44 in symmetry. However, the amount and the position of the bumps are not limited thereto. After rotational molding, two notches 241 are formed on the bottom plate 22. The notches 241 are configured to mount buckles 24 for selectively mounting a resistance band 7 (as shown in FIG. 1). In this embodiment, the buckles 24 are formed on the bottom plate 22 integrally.

Figure 9:
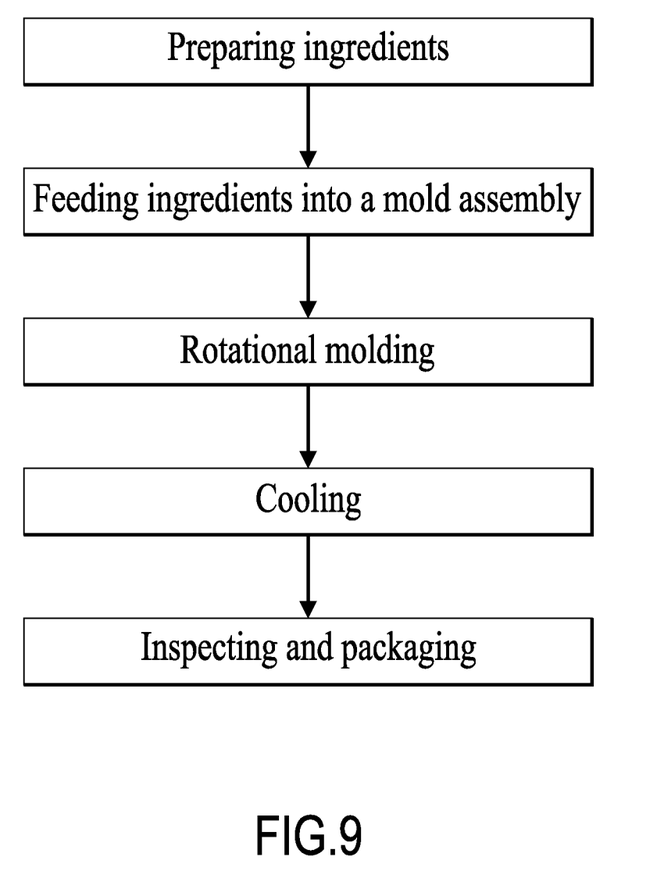
FIG. 9 is a flow chart in accordance with the present invention for manufacturing the balance trainer in FIG. 1 and via the mold assembly in FIG. 4.

Then please refer to FIG. 9. A manufacturing process of a balance trainer formed integrally in accordance with the present invention is provided. The manufacturing process includes the following steps in sequence:

1. Preparation:

According to the hardness of the dome 1 and the base 2 of the balance trainer, preparing and blending ingredients for making a dome and ingredients for making a base respectively. The recipes of making the dome 1 and the base 2 via rotational molding are shown as follows:

| Dome | | Base | |
| --- | --- | --- | --- |
| Material | Weight | Material | Weight |
| Polyvinyl chloride paste resin | 939 g | Polyvinyl chloride paste resin | 1920 g |
| TBC as plasticizer | 385.5 g | TBC as plasticizer | 320 g |
| DOTP as plasticizer | 68.5 g | ESBO as plasticizer | 80 g |
| ESBO as plasticizer | 51 g | D-80 as viscosity reduction | 107.5 g |
| D-80 as viscosity reduction | 40.5 g | TXIB as viscosity reduction | 52.5 g |
| Liquid calcium zinc stabilizing agent | 16.5 g | Liquid calcium zinc stabilizing agent | 20 g | following acts in sequence: weighting ingredients according to the table above, putting said ingredients into a container, blending said ingredients for 1 hour, disposing said ingredients at a vacuumed state for 4 hours, adding color paste or pigment into said ingredients according to a desired color of the dome 1 (for example, adding white paste 7.5 g and colored paste 0.25), blending said ingredients again for 1 hour, and disposing said ingredients at a vacuumed state for 0.5 hour, thereby completing the preparation.

The step for preparing the ingredients of the base 2 includes the following acts in sequence: weighing ingredients according to the table above, putting said ingredients into a container, blending said ingredients for 1 hour, disposing said ingredients at a vacuumed state for 4 hours, adding color paste or pigment into said ingredients according to a desired color of the dome 1 (for example, adding white paste 3.75 g and colored paste 0.08), blending said ingredients again for 1 hour, and disposing said ingredients at a vacuumed state for 0.5 hour, thereby completing the preparation.

Figure 10:
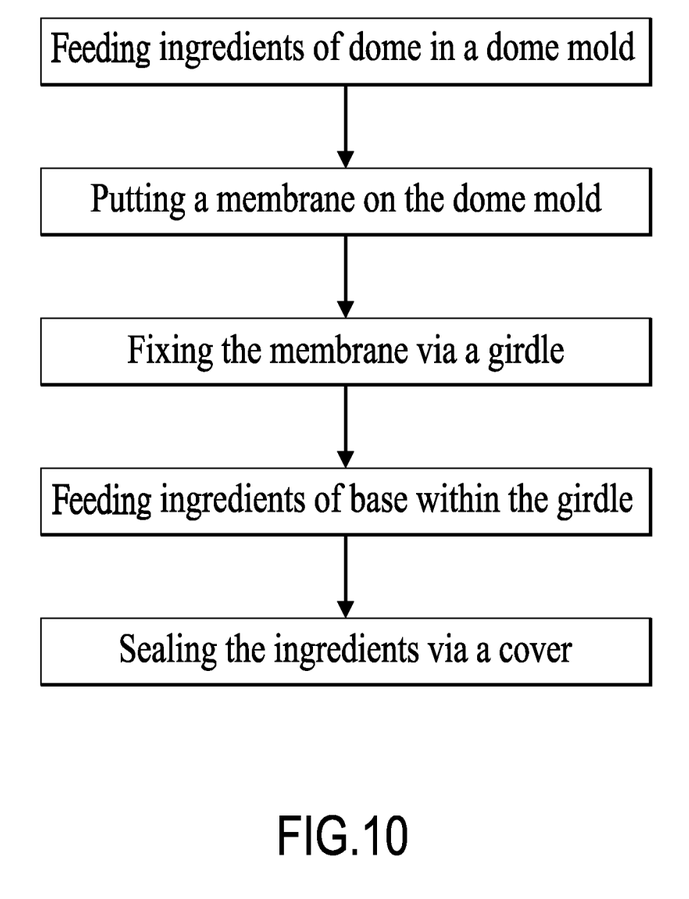
FIG. 10 is a detailed flow chart of the step "Feeding ingredients into a mold assembly" in FIG. 9.

2. Feeding:

The step for feeding the ingredients for making the dome 1 into the mold assembly includes the following acts in sequence: feeding said ingredients for making the dome 1 into the dome mold 3; shearing a PVC membrane 12 so that a diameter of the PVC membrane 12 is larger than an outer diameter of the girdle 4, putting the PVC membrane 12 on a top of the dome mold 3 and covering an opening of the dome mold 3 via the PVC membrane 12, sleeving and fixing the girdle 4 on the top of dome mold 3, evening the PVC membrane 12, fixing the PVC membrane 12; feeding the ingredients for making the base 2 on the PVC membrane 12 and within the girdle 4, and then covering and sealing the ingredients of the base 2 via the cover 5, thereby completing the feeding step.

In this embodiment, ingredients of the PVC membrane 12 may be the same as those of the dome 1, but it is not limited thereto. Besides, the time of shearing of the membrane 12 may be earlier; for example, the shearing can be done even before the manufacturing process of the present invention or after covering via the cover 5.

3. Rotational Molding:

Fixing the mold assembly in a rotary furnace; heating the mold assembly and keeping the temperature at 332° C., rolling the mold assembly at 1100 rpm for 14 minutes, but it is not limited thereto, as the rolling rate and temperature may be different according to different ingredients.

4. Cooling:

Taking out the mold assembly, immersing the mold assembly into a water pool for 25 seconds twice. After 5.5 minutes, open the mold assembly and take out the shaped dome 1 and base 2. Each water pool is maintained below 50° C.

In this embodiment, before rotational molding, the ingredients for making the dome 1 and the base 2 are separated by the membrane 12. After rotational molding, the lower end surface of the dome 1 and the upper end surface of the base 2 are melt-connected to the membrane 12 and thereby forming a balance trainer integrally.

Because the membrane 12 is mounted between the dome mold 3 and the girdle 4, the dome 1 formed between the dome mold 3 and the membrane 12 is made from soft PVC, and the base 2 formed amid the membrane 12, the girdle 4, and the cover 5 is made from hard PVC. After demolding, the connecting ring 21 of the balance trainer corresponds to the inner ring 41 of the girdle 4 and the bottom plate 22 of the balance trainer corresponds to the portion higher than the inner ring 21.

5. Assembling Accessories, Inspecting, and Packaging.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A balance trainer comprising:
    a dome forming:
        an outer edge; and
    a base formed with the dome integrally and located under the dome, the base comprising:
        a bottom plate; and
        a connecting ring formed integrally on the bottom plate and extending upward from the bottom plate, the connecting ring forming a connecting edge facing upward and melt-connected to the outer edge of the dome.

2. The balance trainer as claimed in claim 1, wherein an outer diameter of the outer edge of the dome and an outer diameter of the connecting edge of the base are equal in size.

3. The balance trainer as claimed in claim 1 further comprising:
    at least one non-slip pattern on an outer surface of the dome.

4. The balance trainer as claimed in claim 1 further comprising:
    at least one buckle formed integrally on a protrusion of the base; each one of the at least one buckle comprising:
        a notch concaved from an outer edge of the protrusion; and
        a through hole formed through the protrusion and inner than the notch.

5. The balance trainer as claimed in claim 1 further comprising:
    a plurality of paving pads mounted on the base.

6. The balance trainer as claimed in claim 1, wherein:
    ingredients of the dome include:
        polyvinyl chloride paste resin, an amount thereof ranging from 90 parts to 100 parts by weight;
        a plasticizer, an amount thereof ranging from 45 parts to 55 parts by weight;
        a viscosity reducer, an amount thereof ranging from 3.5 parts to 4.5 parts by weight; and
        a stabilizing agent, an amount thereof ranging from 1 part to 3 parts by weight; and
    ingredients of the base include:
        polyvinyl chloride paste resin, an amount thereof ranging from 180 parts to 220 parts by weight;
        a plasticizer, an amount thereof ranging from 35 parts to 45 parts by weight;
        a viscosity reducer, an amount thereof ranging from 14 parts to 18 parts by weight; and
        a stabilizing agent, an amount thereof ranging from 1 part to 3 parts by weight.

7. The balance trainer as claimed in claim 6, wherein, in the dome:
    the plasticizer contains: epoxidized soybean oil, tributyl citrate, dioctyl terephthalate, or combinations thereof;
    the viscosity reducer contains: PVC viscosity reducer D-80, 2,2,4-trimethylpentane-1,3-diyl bis(2-methylpropanoate), or a combination thereof; and
    the stabilizing agent contains liquid calcium zinc stabilizing agent.

8. The balance trainer as claimed in claim 6, wherein, in the base:
    the plasticizer contains: epoxidized soybean oil, tributyl citrate, acetyl tributyl citrate, dioctyl terephthalate, DNCH, or combinations thereof;

the viscosity reducer contains: PVC viscosity reducer D-80, 2,2,4-trimethylpentane-1,3-diyl bis(2-methylpropanoate), or a combination thereof; and the stabilizing agent contains liquid calcium zinc stabilizing agent.

* * * * *